US012722286B2

(12) United States Patent
Myung et al.

(10) Patent No.: US 12,722,286 B2
(45) Date of Patent: Sep. 1, 2026

(54) LEARNING ROBUST LEGGED ROBOT LOCOMOTION WITH IMPLICIT TERRAIN IMAGINATION VIA DEEP REINFORCEMENT LEARNING

(71) Applicant: UROBOTICS CORP., Seoul (KR)

(72) Inventors: Hyun Myung, Daejeon (KR); I Made Aswin Nahrendra, Daejeon (KR); Byeongho Yu, Daejeon (KR)

(73) Assignee: UROBOTICS CORP., Seoul (KR)

( * ) Notice: Subject to any disclaimer, the term of this patent is extended or adjusted under 35 U.S.C. 154(b) by 162 days.

(21) Appl. No.: 18/610,285

(22) Filed: Mar. 20, 2024

(65) Prior Publication Data

US 2025/0018560 A1 Jan. 16, 2025

(30) Foreign Application Priority Data

Jul. 10, 2023 (KR) ........................ 10-2023-0089039

(51) Int. Cl.

*B25J 9/16* (2006.01)
*B25J 13/08* (2006.01)
*B62D 57/032* (2006.01)

(52) U.S. Cl.

CPC ........... *B25J 9/1602* (2013.01); *B25J 13/088* (2013.01); *B62D 57/032* (2013.01)

(58) Field of Classification Search

CPC ........ B25J 13/088; B25J 9/1602; B25J 9/163; B62D 57/032

See application file for complete search history.

(56) References Cited

U.S. PATENT DOCUMENTS

| | | | | |
|---|---|---|---|---|
| 11,868,882 | B2 * | 1/2024 | Pietquin | G06N 3/0499 |
| 12,151,380 | B2 * | 11/2024 | Whitman | B25J 9/1666 |
| 2021/0397961 | A1 * | 12/2021 | Choi | G05D 1/0214 |
| 2024/0116170 | A1 * | 4/2024 | Luo | B25J 9/1615 |

FOREIGN PATENT DOCUMENTS

KR 20090126090 A * 12/2009 .............. B25J 13/08

OTHER PUBLICATIONS

Fu, Zipeng, et al. "Minimizing energy consumption leads to the emergence of gaits in legged robots." arXiv preprint arXiv:2111.01674 (2021) (Year: 2021).*

(G. Ji, J. Mun, H. Kim and J. Hwangbo, "Concurrent Training of a Control Policy and a State Estimator for Dynamic and Robust Legged Locomotion," in IEEE Robotics and Automation Letters, vol. 7, No. 2, pp. 4630-4637, Apr. 2022 (Year: 2022).*

(Continued)

*Primary Examiner* — Adam R Mott
*Assistant Examiner* — James Miller Watts, III
(74) *Attorney, Agent, or Firm* — S.J. INTELLECTUAL PROPERTY LTD.

(57) ABSTRACT

Disclosed is technology for controlling deep reinforcement learning-based legged robot locomotion by inferring implicit terrain information. A legged robot control method may include inferring an action of a quadrupedal robot from proprioception through a deep reinforcement learning-legged robot model, and a locomotion policy that implicitly infers properties of terrains through which the quadrupedal robot moves may be learned in the legged robot model.

16 Claims, 6 Drawing Sheets

(56) References Cited

OTHER PUBLICATIONS

Lee, Joonho, Jemin Hwangbo, and Marco Hutter. "Robust recovery controller for a quadrupedal robot using deep reinforcement learning." arXiv preprint arXiv:1901.07517 (Year: 2019).*

L. Ren, C. Wang, Y. Yang and Z. Cao, "A learning-based control approach for blind quadrupedal locomotion with guided-DRL and hierarchical-DRL," 2021 IEEE International Conference on Robotics and Biomimetics (ROBIO), Sanya, China, 2021, pp. 881-886, doi: 10.1109/ROBIO54168.2021.9739440 (Year: 2021).*

Translation of KR-20090126090-A (Year: 2009).*

* cited by examiner

FIG. 4

| Reward | Equation ($r_i$) | Weight ($w_i$) |
|---|---|---|
| Lin. velocity tracking | $\exp\{-4(v_{xy}^{cmd}-v_{xy})^2\}$ | 1.0 |
| Ang. velocity tracking | $\exp\{-4(\omega_{yaw}^{cmd}-\omega_{yaw})^2\}$ | 0.5 |
| Linear velocity (z) | $v_z^2$ | -2.0 |
| Angular velocity (xy) | $\omega_{xy}^2$ | -0.05 |
| Orientation | $\|g\|^2$ | -0.2 |
| Joint accelerations | $\ddot{\theta}^2$ | $-2.5\times10^{-7}$ |
| Joint power | $\|\tau\|\|\dot{\theta}\|$ | $-2\times10^{-5}$ |
| Body height | $(h^{des}-h)^2$ | -1.0 |
| Foot clearance | $(p_{f,z,k}^{des}-p_{f,z,k})^2 v_{\cdot f,xy,k}$ | -0.01 |
| Action rate | $(a_t-a_{t-1})^2$ | -0.01 |
| Smoothness | $(a_t-2a_{t-1}+a_{t-2})^2$ | -0.01 |
| Power distribution | $\mathrm{var}(\tau\cdot\dot{\theta})^2$ | $-10^{-5}$ |

| | |
|---|---|
| (dashed box) | Body linear velocity ($V_t$) |
| (solid box) | Context vector ($Z_t$) |
| $o_t^H$ | Temporal partial observations |
| $o_{t+1}$ | Next partial observations |

Figure 6:
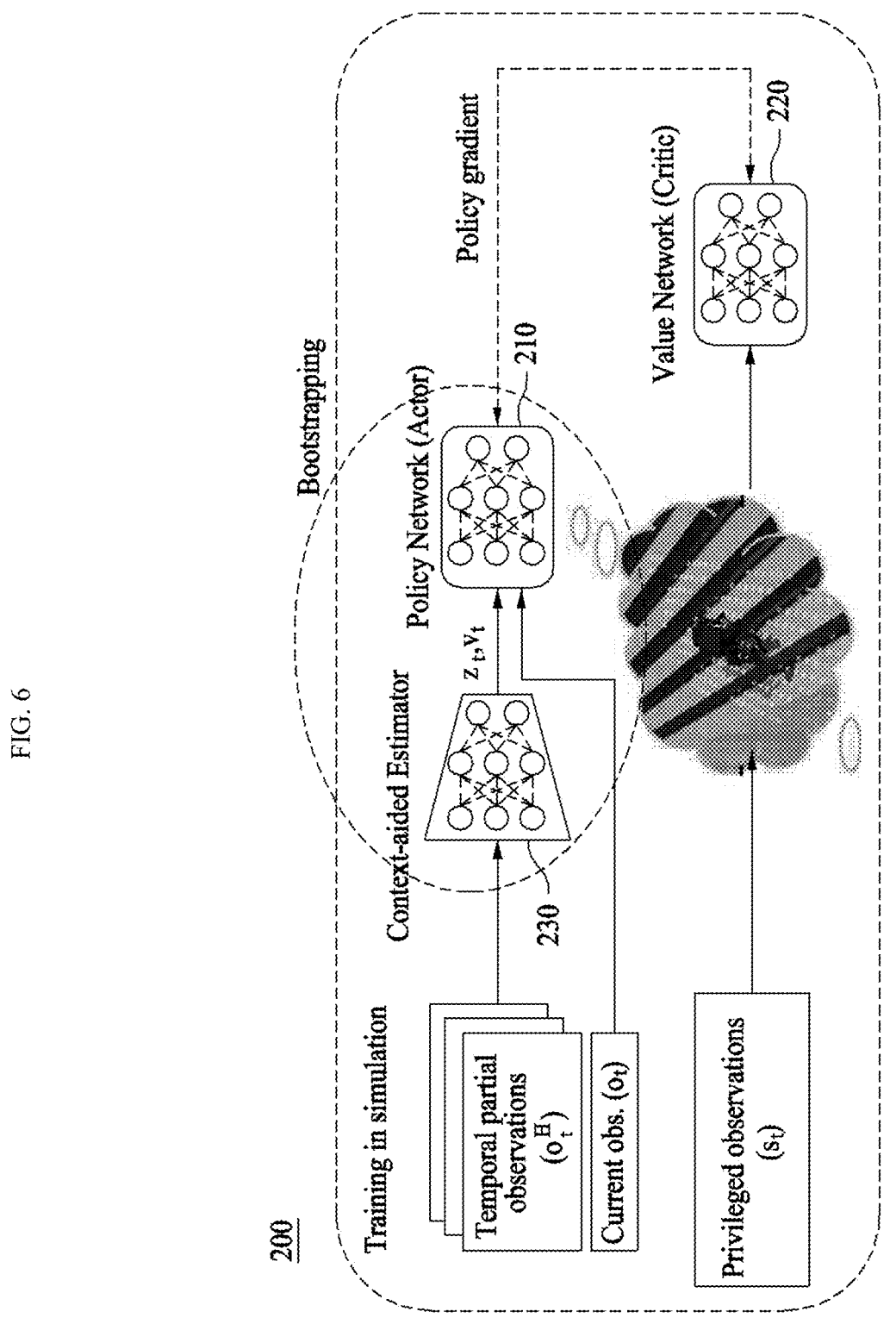

Training in simulation

Bootstrapping

Temporal partial observations ($o_t^H$)

Current obs. ($o_t$)

Privileged observations ($s_t$)

Context-aided Estimator

230

$z_t, v_t$

Policy Network (Actor)

210

Policy gradient

Value Network (Critic)

220

LEARNING ROBUST LEGGED ROBOT LOCOMOTION WITH IMPLICIT TERRAIN IMAGINATION VIA DEEP REINFORCEMENT LEARNING

CROSS-REFERENCE TO RELATED APPLICATION(S)

This application claims the priority benefit of Korean Patent Application No. 10-2023-0089039, filed on Jul. 10, 2023, in the Korean Intellectual Property Office, the disclosure of which is incorporated herein by reference.

BACKGROUND

1. Field of the Invention

Example embodiments of the following description relate to technology for learning a locomotion of a legged robot.

2. Description of the Related Art

In recent years, quadrupedal robots have played an important role in various application fields, such as industrial inspection and exploration.

For example, quadruped robot technology using a piezo-composite actuator is disclosed in Korean Patent Laid-Open Publication No. 10-2009-0126090, published on Dec. 8, 2009.

Unlike wheeled mobile robots, quadrupedal robots may traverse unstructured terrains but are relatively difficult to control.

Conventional model-based controllers often require a complex pipeline that includes state estimation, trajectory optimization, gait optimization, and actuator control.

Such a complex model-based pipeline requires considerable human effort for accurate modeling and rigorous parameter tuning.

Nonlinear models are often required to enable accurate trajectory optimization for the robot's foot. However, it comes at the cost of excessive computational burden. Although, a linearized model can be leveraged, it often limits the controller performance, hindering its full capacity.

SUMMARY

Example embodiments provide a method that may jointly train a robust reinforcement learning-based controller and a context-aided estimator capable of implicitly estimating environmental information in an end-to-end (E2E) manner.

According to an example embodiment, there is provided a legged robot control method performed by a computer device, wherein the computer device includes at least one processor configured to execute computer-readable instructions included in a memory, the legged robot control method includes inferring, by the at least one processor, an action of a quadrupedal robot from proprioception through a deep reinforcement learning-legged robot model, and a locomotion policy that implicitly infers properties of terrains through which the quadrupedal robot moves is learned in the legged robot model.

According to an aspect, a locomotion policy that enables a blind locomotion of the quadrupedal robot using an asymmetric actor-critic architecture may be learned in the legged robot model.

According to another aspect, a context-aided estimator that estimates surrounding environmental information during a learning process of the locomotion policy may be jointly learned in the legged robot model.

According to still another aspect, the legged robot model may be a neural network that infers the action when a proprioceptive observation, a body velocity, and a latent state are given as a policy network configured as an actor network in an asymmetric actor-critic network.

According to still another aspect, the policy network may be trained with an interplay with a value network configured as a critic network in the asymmetric actor-critic network, and the value network may be trained using a disturbance force randomly applied to a robot's body and height information of the robot's surrounding environment.

According to still another aspect, the proprioceptive observation may be measured using a joint encoder and an inertial measurement unit (IMU), and the body velocity and the latent state may be estimated using the context-aided estimator.

According to still another aspect, the proprioceptive observation may include at least one of a body angular velocity, a gravity vector in a body frame, a body velocity command, a joint angle, a joint angular velocity, and a previous action.

According to still another aspect, the policy network may be trained to infer a joint angle around a robot's stand still pose.

According to still another aspect, the context-aided estimator may be optimized using a hybrid loss function that includes body velocity estimation loss and variational auto-encoder (VAE) loss.

According to still another aspect, the context-aided estimator may include a body velocity estimation model and an auto-encoder model that shares a unified encoder.

According to still another aspect, the context-aided estimator may include a single encoder and a multi-head decoder and may encode the proprioceptive observation into the body velocity the latent state through the encoder.

According to still another aspect, a power distribution reward for a motor used on the robot may be included in a reward function to train the policy network.

According to still another aspect, adaptive bootstrapping for adaptively tuning a bootstrapping probability may be performed according to a reward coefficient of variation by the context-aided estimator during training of the policy network.

According to an example embodiment, there is provided a non-transitory computer-readable recording medium storing instructions that, when executed by a processor, cause the processor to perform a legged robot control method including inferring an action of a quadrupedal robot from proprioception through a deep reinforcement learning-legged robot model, wherein a locomotion policy that implicitly infers properties of terrains through which the quadrupedal robot moves is learned in the legged robot model.

According to an example embodiment, there is provided a computer-implemented legged robot control system including at least one processor configured to execute computer-readable instructions included in a memory, wherein the at least one processor is configured to process a process of inferring an action of a quadrupedal robot from proprioception through a deep reinforcement learning-legged robot model, and a locomotion policy that implicitly infers properties of terrains through which the quadrupedal robot moves is learned in the legged robot model.

According to some example embodiments, it is possible to make a control policy and a state estimation network complement each other by jointly training a robust reinforcement learning-based controller and a context-aided estimator capable of implicitly estimating environmental information with E2E.

According to some example embodiments, it is possible to operate results trained in a simulator on a low-power computer in real time without separate parameter tuning by jointly training a controller and a state estimator to complement each other.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 4 illustrates details of a reinforcement learning reward function according to an example embodiment;

FIG. 6 illustrates an estimator network that performs adaptive bootstrapping according to an example embodiment.

DETAILED DESCRIPTION

Hereinafter, example embodiments will be described in detail with reference to the accompanying drawings.

The example embodiments relate to technology for learning a locomotion of a legged robot.

The example embodiments including the disclosures herein may jointly train a robust reinforcement learning-based controller and a context-aided estimator capable of implicitly estimating environmental information with end-to-end (E2E) to complement each other.

A legged robot control system according to example embodiments may be implemented by at least one computer device, and a legged robot control method according to the example embodiments may be performed through at least one computer device included in the legged robot control system. Here, a computer program according to an example embodiment may be installed and run on the computer device, and the computer device may perform the legged robot control method according to the example embodiments under control of the running computer program. The computer program may be stored in a computer-readable recording medium to computer-implement the legged robot control method in conjunction with the computer device.

Figure 1:
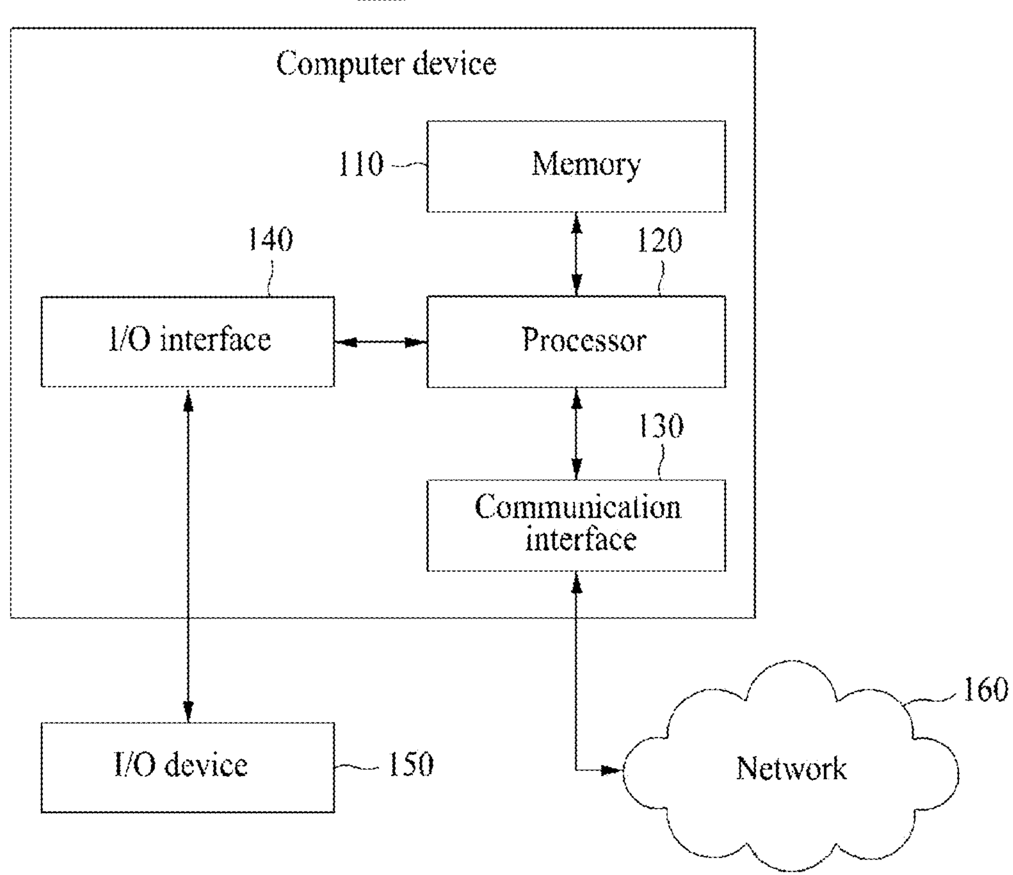
FIG. 1 is a block diagram illustrating an example of an internal configuration of a computer device according to an example embodiment.

FIG. 1 is a block diagram illustrating an example of a computer device according to an example embodiment. For example, a legged robot control system according to example embodiments may be implemented by a computer device 100 of FIG. 1.

Referring to FIG. 1, the computer device 100 may include a memory 110, a processor 120, a communication interface 130, and an input/output (I/O) interface 140 as components for performing a legged robot control method according to example embodiments.

The memory 110 may include a permanent mass storage device, such as a random access memory (RAM), a read only memory (ROM), and a disk drive, as a non-transitory computer-readable recording medium. The permanent mass storage device, such as ROM and a disk drive, may be included in the computer device 100 as a permanent storage device separate from the memory 110. Also, an operating system (OS) and at least one program code may be stored in the memory 110. Such software components may be loaded to the memory 110 from another non-transitory computer-readable recording medium separate from the memory 110. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 110 through the communication interface 130, instead of the non-transitory computer-readable recording medium. For example, the software components may be loaded to the memory 110 of the computer device 100 based on a computer program installed by files received over a network 160.

The processor 120 may be configured to process instructions of a computer program by performing basic arithmetic operations, logic operations, and I/O operations. The computer-readable instructions may be provided by the memory 110 or the communication interface 130 to the processor 120. For example, the processor 120 may be configured to execute received instructions in response to a program code stored in a storage device, such as the memory 110.

The communication interface 130 may provide a function for communication between the computer device 100 and another apparatus over the network 160. For example, the processor 120 of the computer device 100 may forward a request or an instruction created based on a program code stored in the storage device such as the memory 110, data, and a file, to other apparatuses over the network 160 under control of the communication interface 130. Inversely, a signal, an instruction, data, a file, etc., from another apparatus may be received at the computer device 100 through the communication interface 130 of the computer device 100 over the network 160. For example, a signal, an instruction, data, etc., received through the communication interface 130 may be forwarded to the processor 120 or the memory 110, and a file, etc., may be stored in a storage medium, for example, the permanent storage device, further includable in the computer device 100.

A communication scheme is not limited and may include a near distance wired/wireless communication between devices as well as a communication scheme using a communication network (e.g., mobile communication network, wired Internet, wireless Internet, and broadcasting network) includable in the network 160. For example, the network 160 may include at least one network among networks, such as a personal area network (PAN), a local area network (LAN), a campus area network (CAN), a metropolitan area network (MAN), a wide area network (WAN), a broadband network (BBN), and the Internet. Also, the network 160 may include at least one network topology that includes a bus network, a star network, a ring network, a mesh network, a star-bus network tree or hierarchical network, and the like, but is not limited thereto.

The I/O interface 140 may be a device used for interfacing with an I/O device 150. For example, an input device may include a device, such as a microphone, a keyboard, a mouse, etc., and an output device may include a device, such as a display, a speaker, etc. As another example, the I/O interface 140 may be a device for interfacing with an apparatus in which an input function and an output function are integrated into a single function, such as a touchscreen. The I/O device 150 may be configured as a single apparatus with the computer device 100.

Also, according to other example embodiments, the computer device 100 may include a greater or smaller number of components than the number of components shown in FIG. 1. However, there is no need to clearly illustrate most conventional components. For example, the computer device 100 may be configured to include at least a portion of the I/O device 150 or may further include other components, such as a transceiver, various types of sensors, and a database.

Hereinafter, a specific example embodiment of technology for controlling locomotion of a deep reinforcement learning-based legged robot through implicit terrain information inference will be described.

Quadrupedal robots resemble the physical ability of legged animals to walk through unstructured terrains. However, designing a controller for quadrupedal robots poses a significant challenge due to their functional complexity and requires adaptation to various terrains.

Legged animals may efficiently plain their gait by visually perceiving surrounding terrains. This natural mechanism has inspired many works on training a perceptive locomotion policy through deep reinforcement learning (RL) that enables a quadrupedal robot to traverse unstructured terrains. In these frontier works, the robot is equipped with exteroceptive sensors, such as a camera or LiDAR, to observe surroundings. Subsequently, exteroception is used with the controller to plan the robot's trajectory and gait to traverse through an environment safely.

However, exteroception may not always be dependable. A camera may malfunction in adverse weather and lighting conditions, and while a three-dimensional (3D) LiDAR may be used to distinguish ground and traversable regions, accurately estimating physical characteristics of the terrain remains challenging. For example, snow may appear as solid and passable surface, but is actually soft and pliable. Also, tall grass that appears impassable to a camera may be still easily traversed by legged robots.

Meanwhile, proprioceptive sensors, such as an inertial measurement unit (IMU) and a joint encoder, are relatively light and robust compared to exteroceptive sensors. According to recent works, a quadrupedal robot may learn to estimate its surrounding terrain and body state by combining various proprioception modalities. However, these works have a limited empirical demonstration for a long-distance operation with various challenging terrains in which a legged robot may fail due to high uncertainty and estimation errors.

Estimating the surrounding terrains' properties through proprioception while learning a locomotion policy requires an iterative process. The locomotion policy needs to understand terrain properties to learn robust behavior. However, to adequately learn the terrain properties, the robot needs to be able to walk accordingly and to explore a wide spectrum of terrain properties. This dilemma is often called a representation learning bottleneck, which may hinder optimal policy learning. Therefore, a learning framework that jointly learns a robust policy with an accurate environment representation is required.

Herein, proposed is a framework called dream walking for quadrupedal robot (DreamWaQ) that trains a robust locomotion policy for quadrupedal robots with only proprioception through a deep reinforcement learning algorithm. DreamWaQ trains the locomotion policy to implicitly infer terrain proprieties, such as a height map, friction, restitution, and obstacle. Consequently, the robot may adapt its gait to walk safely through various terrains.

DreamWaQ according to the present invention may include (1) policy learning that enables a robust blind locomotion using an asymmetric actor-critic architecture, (2) a context-aided estimator (CENet) that may estimate surrounding environmental information as well as velocity of a legged robot, and (3) adaptive bootstrapping for robust and fast learning.

DreamWaQ is described in detail as follows.

Initially, the environment herein may be modeled as an infinite-horizon partially observable Markov decision process (POMDP), defined by tuple $\mathcal{M}=(\mathcal{S}, \mathcal{O}, \mathcal{A}, d_0, p, r, \gamma)$. A full state, partial observation, and action are continuous and defined by $s\in\mathcal{S}$, $o\in\mathcal{O}$, and $a\in\mathcal{A}$, respectively. The environment starts with an initial state distribution, $d_0(s_0)$; progresses with a state transition probability $p(s_{t+1}|s_t, a_t)$; and each transition is reward with a reward function, $r: \mathcal{S}\times\mathcal{A}\rightarrow\mathcal{R}$. A discount factor is defined by $\gamma\in[0, 1)$. In the example embodiment, temporal observation at time t over past H measurements is defined as $$o_t^H = [o_t \;\; o_{t-1} \;\; \ldots \;\; o_{t-H}]^T.$$

Also, a context vector, $z_t$, which includes a latent representation of a world state is defined. A method of inferring the context vector will be further described below.

Implicit Terrain Imagination

Recent works for implicit terrain imagination have leveraged a teacher-student training paradigm. Although it has been empirically shown that a student policy is as good as a teacher policy, behavior cloning (BC) bounds the student policy's performance with the teacher policy. In addition, sequentially training teacher and student networks is data inefficient. The student policy may be unable to explore a failure state in which the teacher policy has learned in an initial stage of learning using reinforcement learning. This limitation is because the student policy is only provided with good action supervision from the teacher policy during a behavior cloning (BC) period.

Figure 2:
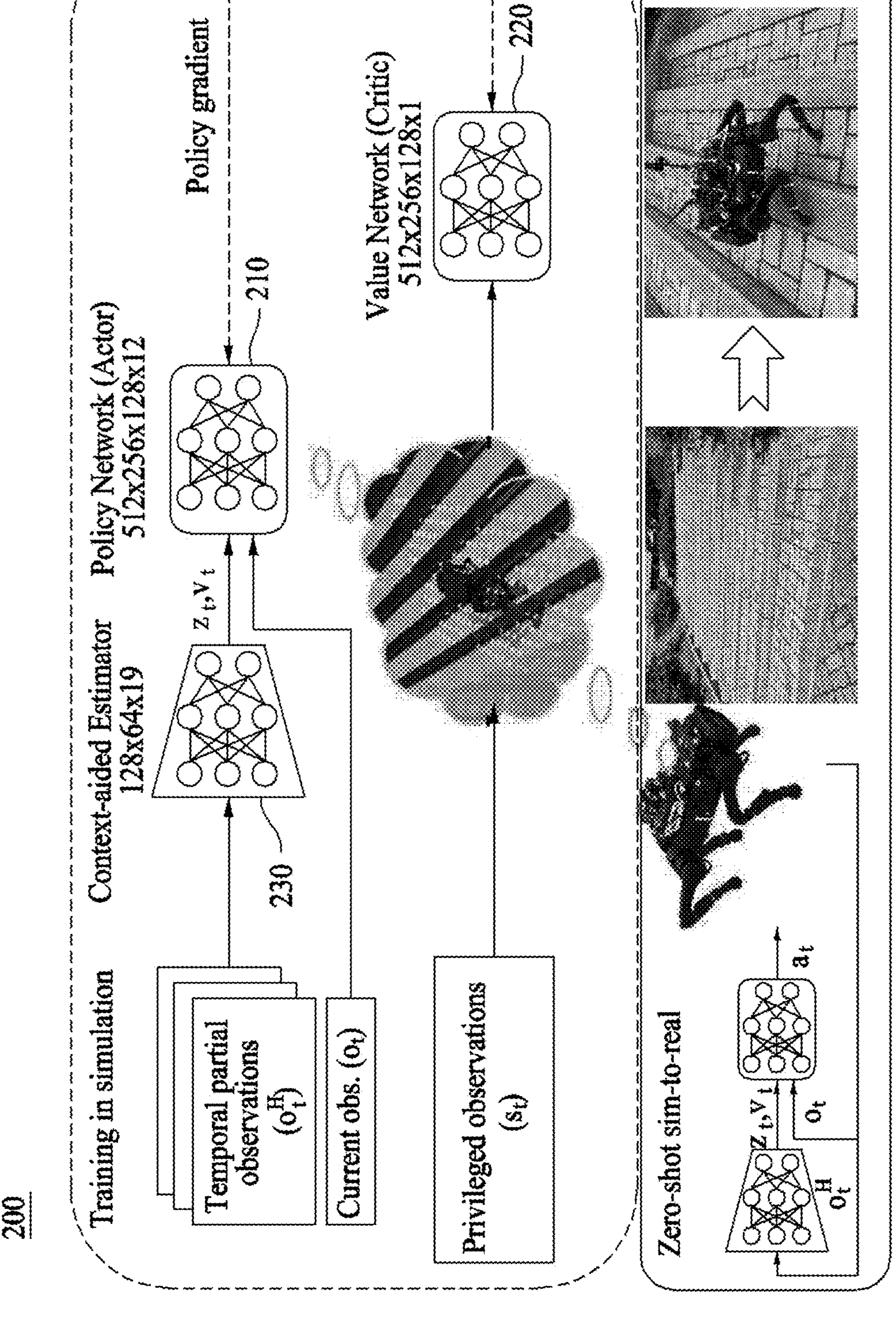
FIG. 2 illustrates overview of a framework called dream walking for quadrupedal robots (DreamWaQ) according to an example embodiment.

FIG. 2 illustrates overview of a framework called DreamWaQ according to an example embodiment. FIG. 2 illustrates a process of learning a locomotion policy in a simulation such that a robot may walk through challenging terrains, such as stairs, with a zero-shot simulation.

Referring to FIG. 2, a DreamWaQ model 200 may include a policy network 210 and a value network 220 that are configured in an asymmetric actor-critic architecture.

For learning implicit terrain imagination, the asymmetric actor-critic architecture is adopted. An interplay between the policy network 210 and the value network 220 in an actor-critic algorithm is sufficient for learning a robust locomotion policy that may implicitly imagine privileged observation, given temporal partial observations. Referring to FIG. 2, in DreamWaQ, the policy network (actor network) 210 receives temporal partial observations $$o_t^H$$

as input and the value network (critic network) 220 receives the full state $s_t$. In the example embodiment, H=5 is used. Since only one training phase is required, data efficiency during training may be significantly improved. Also, this policy may explore all possible trajectories during training, improving its robustness through generalization. In the example embodiment, the policy may be optimized using a proximal policy optimization (PPO) algorithm.

1) Policy Network 210

The policy, $\pi_\phi(a_t|o_t, v_t, z_t)$, refers to a neural network parameterized by $\phi$ that infers an action at, given a proprioceptive observation $o_t$, a body velocity $v_t$, and a latent state $z_t$. $o_t$ is directly measured from a joint encoder and an IMU, while $v_t$ and $z_t$ are estimated by a context-aided estimator network (CENet) 230.

$o_t$ is an n×1 vector defined as in Equation 1.

$$o_t = \left[\omega_t \quad g_t \quad c_t \quad \theta_t \quad \dot{\theta}_t \quad a_{t-1}\right]^T \qquad \text{[Equation 1]}$$

Here, $\omega_t$, $g_t$, $c_t$, $\theta_t$, $\dot{\theta}_t$, and $a_{t-1}$ denote a body angular velocity, a gravity vector in a body frame, a body velocity command, a joint angle, a joint angular velocity, and a previous action, respectively.

2) Value Network 220

The value network 220 is trained to output an estimation of the state value $V(s_t)$. Unlike the policy network 210, the value network 220 receives the privileged observation, $s_t$, and $s_t$ is defined as Equation 2.

$$s_t = [\,o_t \quad v_t \quad d_t \quad h_t\,]^T \qquad \text{[Equation 2]}$$

Here, $d_t$ denotes a disturbance force randomly applied to the robot's body and $h_t$ denotes height map scan of the robot's surroundings as an exteroceptive signal for the value network 220. In the DreamWaQ model 200, the policy network 210 may be trained to implicitly infer $d_t$ and $h_t$ from proprioception.

Figure 3:
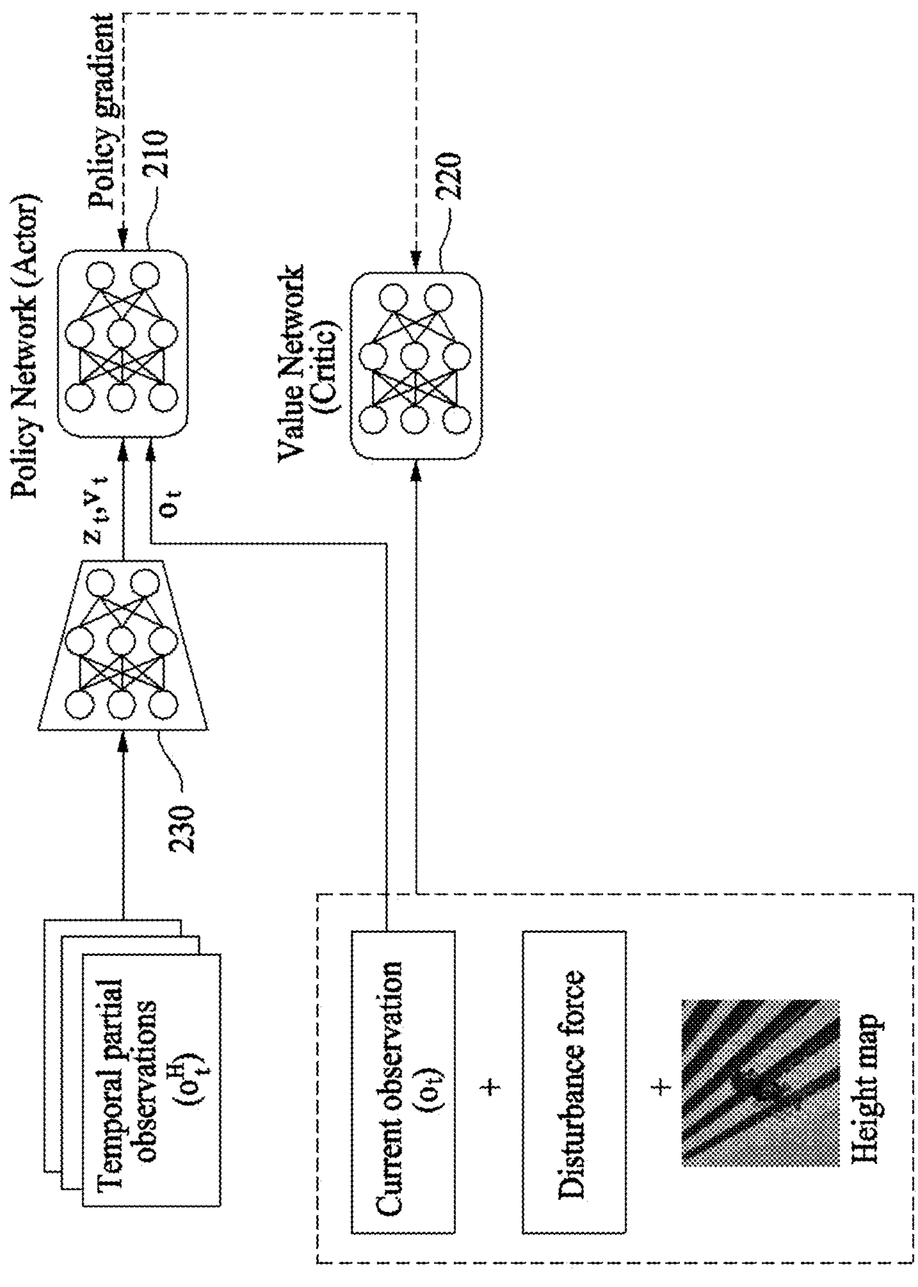
FIG. 3 illustrates an asymmetric actor-critic architecture for learning implicit terrain imagination according to an example embodiment.

The DreamWaQ model 200 is implemented as a policy learning model that enables a robust blind locomotion using an asymmetric actor-critic architecture. Referring to FIG. 3, the value network 220 of a critic that determines whether an actor is well trained may be aware of surrounding information by learning the disturbance force (i.e., $d_t$) and surrounding environment's height information (i.e., $h_t$). Unlike a simulation, surrounding terrain information may not be obtained from a real blind locomotion. That is, only the policy network 210 of the actor may be mounted to the legged robot.

3) Action Space

The action space refers to a 12×1 vector a corresponding to a desired joint angle of the robot. To facilitate learning, the policy is trained to infer a desired joint angle around the robot's stand still pose, $\theta_{stand}$. Therefore, the robot's desired joint angle is defined as Equation 3.

$$\theta_{des} = \theta_{stand} + a_t \qquad \text{[Equation 3]}$$

The desired joint angle may be tracked using a proportional-derivative (PD) controller for each joint.

4) Reward Function

In the example embodiment, the reward function may follow other works to highlight the effect of components of the DreamWaQ model 200 instead of reward tuning. The reward function includes a task reward for tracking a commanded velocity and a stability reward for producing a stable and natural locomotion behavior.

Details of the reward function are presented in a table of FIG. 4. In the table of FIG. 4, exp(·) and var(·) denote an exponential operator and a variance operator, respectively, and $(\cdot)^{des}$ and $(\cdot)^{cmd}$ denote a desired value and a commanded value, respectively. x, y, and z are defined on the robot's body frame with x and z pointing forward and upward, respectively. Also, g, $v_{xy}$, $\omega_{yaw}$, h, $p_{f,z,k}$, $v_{f,xy,k}$, and $\tau$ denote a gravity vector projected into the robot's body frame, a linear velocity in xy plane, a yaw rate, a body height (w.r.t.) ground, a foot height, a foot lateral velocity, and a joint torque, respectively.

A total reward of the policy for taking an action in each state is given as Equation 4.

$$r_t(s_t, a_t) = \sum r_i w_i \qquad \text{[Equation 4]}$$

Here, i denotes an index of each reward as shown in the table of FIG. 4.

A complex reward function for learning a locomotion policy usually includes a motor power minimization term. However, this reward minimizes the overall power without considering each motor's power usage balance. Consequently, some motors may overheat faster than other motors. Therefore, a power distribution reward may be introduced to reduce motor overheating in the real world by penalizing output from a motor with high variance over all motors used on the robot 5) Curriculum Learning In the example embodiment, a game-inspired curriculum may be employed to ensure progressive locomotion policy learning over difficult terrains. The terrains may include smooth, rough, discretized, and stair terrains with ten levels of inclination within [0°, 22°]. Also, utilizing a grid-adaptive curriculum for low-speed locomotion may result in better and more stable turning that prevents foot tripping.

Context-Aided Estimator Network

The performance of state estimation results may be degraded for various reasons, such as noise in observation values, a robot foot slipping or tripping phenomenon, a sudden locomotion, and accumulated drift.

The policy trained based on implicit terrain imagination requires $v_t$ and $z_t$ as input, which may be estimated from proprioceptive observation $o_t$. $z_t$ may be estimated as a latent variable for understanding terrain properties. Also, estimating $v_t$ using a learned network may significantly improve robustness of the locomotion policy by eliminating the accumulated estimation drift.

Through motivation, an interplay between terrain and body state estimation may significantly improve accuracy of the body state estimation. Instead of simply estimating a state of the robot, the context-aided estimator network 230 is used to jointly learn to estimate and infer a latent representation of an environment.

A learning-based state estimator is more robust to drift that is difficult for probabilistic uncertainty and modeling. Learning the robot's dynamics together may improve accuracy of the learned state estimator and a method of explicitly estimating the robot's velocity and estimating a surrounding environment as latent representation may obtain more robust and precise state estimation results.

Figure 5:
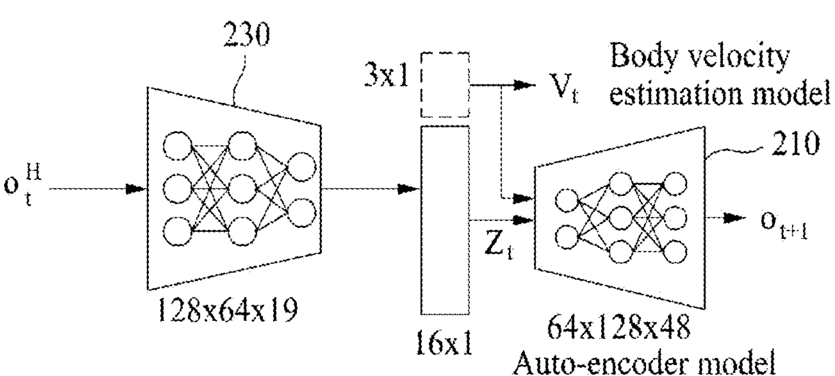
FIG. 5 illustrates an example of describing a context-aided estimator network according to an example embodiment.

FIG. 5 illustrates an example of describing a context-aided estimator network according to an example embodiment.

The context-aided estimator network 230 may be significantly simplified and asynchronously run during inference due to a shared encoder architecture. An encoder network may jointly learn the robot's forward and backward dynamics through an auto-encoding mechanism and thus, may increase the accuracy.

Referring to FIG. 5, the context-aided estimator network 230 may include a body velocity estimation model and an auto-encoder model that shares a unified encoder. The shared encoder may be trained to provide a robust body state and context estimation jointly.

That is, the context-aided estimator network 230 includes a single encoder and a multi-head decoder architecture. The encoder network encodes $$o_t^H$$

into $v_t$ and $z_t$. A first head estimates $v_t$ and a second head reconstructs $o_{t+1}$. In the example embodiment, a β-variational auto-encoder (VAE) may be used as the auto-encoder architecture.

The context-aided estimator network 230 is optimized using a hybrid loss function defined as Equation 5.

$$\mathcal{L}_{CE} = \mathcal{L}_{est} + \mathcal{L}_{VAE} \quad \text{[Equation 5]}$$

Here, $\mathcal{L}_{est}$ denotes body velocity estimation loss and $\mathcal{L}_{VAE}$ denotes VAE loss. For explicit state estimation, mean-squared-error (MSE) loss (Equation 6) between estimated body velocity $\tilde{v}_t$ and ground truth $v_t$ from a simulator may be used.

$$\mathcal{L}_{est} = MSE(\tilde{v}_t, v_t) \quad \text{[Equation 6]}$$

A VAE network is trained with standard VAE loss that includes reconstruction loss and latent loss. MSE may be employed for the reconstruction loss and Kullback-Leibler divergence (KLD) may be employed as the latent loss. The VAE loss may be formulated as Equation 7.

$$\mathcal{L}_{VAE} = MSE(\tilde{o}_{t+1}, o_{t+1}) + \beta D_{KL}\left(q\left(z_t \mid o_t^H\right) \| p(z_t)\right) \quad \text{[Equation 7]}$$

Here, $\tilde{O}_{t+1}$ denotes a reconstructed next observation and $$q\left(z_t \mid o_t^H\right)$$

denotes a posterior distribution of $z_t$, given $$o_t^H.$$

$p(z_t)$ denotes the context's prior distribution parameterized by a Gaussian distribution. A standard normal distribution for the prior distribution may be selected since all observations are normalized to have zero mean and unit variance.

Adaptive Bootstrap

FIG. 6 illustrates an estimator network that performs adaptive bootstrapping according to an example embodiment.

Referring to FIG. 6, an adaptive bootstrap (AdaBoot) for robust and fast learning may be applied to the DreamWaQ model 200.

Bootstrapping from the context-aided estimator network 230 during training of the policy network 210 may improve simulation and sim-to-real robustness of a learned policy. However, bootstrapping may also harm performance of the policy due to large learning noise at an initial stage of learning. Therefore, proposed is an adaptive bootstrapping method that may adaptively tune a bootstrapping probability during model training.

The adaptive bootstrapping method is controlled by a coefficient of variation (CV), i.e., a ratio of standard deviation to the mean, of an episodic reward over m domain-randomized environments. A key idea is that bootstrapping is required when CV of agents' rewards is small to make the policy more robust against inaccurate estimation. However, when the agents have not learned well enough, bootstrapping does not need to be performed, as indicated by large CV in the rewards. That is, a high bootstrapping probability may be applied for a reward with small variation (good policy) and a low bootstrapping probability may be applied for a reward with large variation (bad policy).

A bootstrapping probability for each learning iteration may be defined as Equation 8.

$$p_{boot} = 1 - \tanh(CV(R(s_t, a_t))) \quad \text{[Equation 8]}$$

Here, $p_{boot} \in [0,1]$ denotes the bootstrapping probability and R denotes an m×1 vector of episodic rewards from m domain-randomized environments. Also, CV(·) denotes a coefficient of variation operation and tanh(·) denotes a hyperbolic tangent operation. Here, tanh used to smoothly upper-bounds CV(R) to 1.

Therefore, the DreamWaQ model 200 may exhibit more improved performance than the conventional learning-based controller, as a learning framework that enables a quadrupedal robot to traverse unstructured terrains depending on only proprioception.

According to some example embodiments, it is possible to make a control policy and a state estimation network complement each other by jointly training a robust reinforcement learning-based controller and a context-aided estimator capable of implicitly estimating environmental information with E2E. According to some example embodiments, it is possible to operate results trained in a simulator on a low-power computer in real time without separate parameter tuning by jointly training a controller and a state estimator to complement each other.

The apparatuses described herein may be implemented using hardware components, software components, and/or a combination thereof. For example, apparatuses and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to be performed through various computer methods. Here, the media may continuously store a computer-executable program or may temporarily store the same for execution or download. Also, the media may be various recording devices or storage devices in which a single piece of hardware or a plurality of hardware is combined and may be distributed over a network without being limited to media directly connected to a computer system. Examples of non-transitory computer-readable media include magnetic media such as hard disks, floppy disks, and magnetic tapes; optical media such as CD ROM disks and DVDs; magneto-optical media such as floptical disks; and hardware devices that are specially designed to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

While the example embodiments are described with reference to specific example embodiments and drawings, it will be apparent to one of ordinary skill in the art that various changes and modifications in form and details may be made in these example embodiments from the description. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A legged robot control method performed by a computer device, wherein the computer device comprises at least one processor configured to execute computer-readable instructions included in a memory, the legged robot control method comprises inferring, by the at least one processor, an action of a quadrupedal robot from proprioception through a deep reinforcement learning-legged robot model, and a locomotion policy that implicitly infers properties of terrains through which the quadrupedal robot moves is learned in the legged robot model, wherein (a) a context-aided estimator that estimates surrounding environmental information during a learning process of the locomotion policy is jointly learned in the legged robot model, (b) the legged robot model is a neural network that infers the action when a proprioceptive observation, a body velocity, and a latent state are given as a policy network configured as an actor network in an asymmetric actor-critic network, and (c) the context-aided estimator is optimized using a hybrid loss function that includes body velocity estimation loss and variational auto-encoder (VAE) loss.

2. The legged robot control method of claim 1, wherein a locomotion policy that enables a blind locomotion of the quadrupedal robot using an asymmetric actor-critic architecture is learned in the legged robot model.

3. The legged robot control method of claim 1, wherein the policy network is trained with an interplay with a value network configured as a critic network in the asymmetric actor-critic network, and the value network is trained using a disturbance force randomly applied to a robot's body and height information of the robot's surrounding environment.

4. The legged robot control method of claim 1, wherein the proprioceptive observation is measured using a joint encoder and an inertial measurement unit (IMU), and the body velocity and the latent state are estimated using the context-aided estimator.

5. The legged robot control method of claim 1, wherein the proprioceptive observation includes at least one of a body angular velocity, a gravity vector in a body frame, a body velocity command, a joint angle, a joint angular velocity, and a previous action.

6. The legged robot control method of claim 1, wherein the policy network is trained to infer a joint angle around a robot's stand still pose.

7. The legged robot control method of claim 1, wherein the context-aided estimator includes a body velocity estimation model and an auto-encoder model that shares a unified encoder.

8. The legged robot control method of claim 1, wherein the context-aided estimator includes a single encoder and a multi-head decoder and encodes the proprioceptive observation into the body velocity and the latent state through the encoder.

9. The legged robot control method of claim 1, wherein a power distribution reward for a motor used on the robot is included in a reward function to train the policy network.

10. A legged robot control method performed by a computer device, wherein the computer device comprises at least one processor configured to execute computer-readable instructions included in a memory, the legged robot control method comprises inferring, by the at least one processor, an action of a quadrupedal robot from proprioception through a deep reinforcement learning-legged robot model, and a locomotion policy that implicitly infers properties of terrains through which the quadrupedal robot moves is learned in the legged robot model, wherein (a) a context-aided estimator that estimates surrounding environmental information during a learning process of the locomotion policy is jointly learned in the legged robot model, (b) the legged robot model is a neural network that infers the action when a proprioceptive observation, a body velocity, and a latent state are given as a policy network configured as an actor network in an asymmetric actor-critic network, and (c) the context-aided estimator is optimized using a hybrid loss function that includes body velocity estimation loss and variational auto-encoder (VAE) loss, and (d) adaptive bootstrapping for adaptively tuning a bootstrapping probability is performed according to a reward coefficient of variation by the context-aided estimator during training of the policy network.

11. A non-transitory computer-readable recording medium storing instructions that, when executed by a processor, cause the processor to perform a legged robot control method comprising inferring an action of a quadrupedal robot from proprioception through a deep reinforcement learning-legged robot model, wherein a locomotion policy that implicitly infers properties of terrains through which the quadrupedal robot moves is learned in the legged robot model, wherein (a) a context-aided estimator that estimates surrounding environmental information during a learning process of the locomotion policy is jointly learned in the legged robot model, (b) the legged robot model is a neural network that infers the action when a proprioceptive observation, a body velocity, and a latent state are given as a policy network configured as an actor network in an asymmetric actor-critic network, and (c) the context-aided estimator is optimized using a hybrid loss function that includes body velocity estimation loss and variational auto-encoder (VAE) loss.

12. A computer-implemented legged robot control system comprising:

at least one processor configured to execute computer-readable instructions included in a memory, wherein the at least one processor is configured to process a process of inferring an action of a quadrupedal robot from proprioception through a deep reinforcement learning-legged robot model, and a locomotion policy that implicitly infers properties of terrains through which the quadrupedal robot moves is learned in the legged robot model, wherein (a) a context-aided estimator that estimates surrounding environmental information during a learning process of the locomotion policy is jointly learned in the legged robot model, (b) the legged robot model is a neural network that infers the action when a proprioceptive observation, a body velocity, and a latent state are given as a policy network configured as an actor network in an asymmetric actor-critic network, and (c) the context-aided estimator is optimized using a hybrid loss function that includes body velocity estimation loss and variational auto-encoder (VAE) loss.

13. The legged robot control system of claim 12, wherein:

the policy network is trained with an interplay with a value network configured as a critic network in the asymmetric actor-critic network, and the value network is trained using a disturbance force randomly applied to a robot's body and height information of the robot's surrounding environment.

14. The legged robot control system of claim 13, wherein:

the proprioceptive observation is measured using a joint encoder and an inertial measurement unit (IMU), the body velocity and the latent state are estimated using the context-aided estimator, and the context-aided estimator includes a single encoder and a multi-head decoder and encodes the proprioceptive observation into the body velocity and the latent state through the encoder.

15. The legged robot control system of claim 13, wherein a power distribution reward for a motor used on the robot is included in a reward function to train the policy network.

16. The legged robot control system of claim 13, wherein adaptive bootstrapping for adaptively tuning a bootstrapping probability is performed according to a reward coefficient of variation by the context-aided estimator during training of the policy network.

* * * * *